United States Patent
Rodriguez

(10) Patent No.: US 9,003,503 B2
(45) Date of Patent: *Apr. 7, 2015

(54) VIRTUAL COMPUTER AND SERVICE

(75) Inventor: Peter P. Rodriguez, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/600,836

(22) Filed: Aug. 31, 2012

(65) Prior Publication Data

US 2013/0024922 A1    Jan. 24, 2013

Related U.S. Application Data

(63) Continuation of application No. 13/187,815, filed on Jul. 21, 2011.

(51) Int. Cl.
| | |
|---|---|
| G06F 15/16 | (2006.01) |
| G06F 17/30 | (2006.01) |
| G06F 9/50 | (2006.01) |
| G06F 21/33 | (2013.01) |
| H04L 29/06 | (2006.01) |
| G06F 9/455 | (2006.01) |

(52) U.S. Cl.
CPC ............ *G06F 9/5072* (2013.01); *G06F 21/335* (2013.01); *H04L 63/083* (2013.01); *G06F 9/45558* (2013.01); *G06F 9/5077* (2013.01); *H04L 63/0435* (2013.01); *G06F 2009/45562* (2013.01); *G06F 2009/45587* (2013.01)

(58) Field of Classification Search
CPC . G06F 9/5077; G06F 9/5072; G06F 9/45538; G06F 21/6209; H04L 63/083
See application file for complete search history.

(56) References Cited

U.S. PATENT DOCUMENTS

| | | | |
|---|---|---|---|
| 6,880,002 B2 | 4/2005 | Hirschfeld et al. | |
| 6,990,666 B2 | 1/2006 | Hirschfeld et al. | |
| 7,257,584 B2 | 8/2007 | Hirschfeld et al. | |
| 7,325,040 B2 * | 1/2008 | Truong | 709/217 |
| 7,437,423 B1 | 10/2008 | Gole | |
| 7,444,423 B2 | 10/2008 | Shahi et al. | |
| 7,768,959 B1 | 8/2010 | Chen et al. | |
| 7,774,596 B2 * | 8/2010 | Flynn | 713/161 |

(Continued)

OTHER PUBLICATIONS

Interntional Search Report; International Application No. PCT/US2012/046370; International Filing Date: Jul. 12, 2012; Date of Mailing: Sep. 24, 2012; pp. 1-12.

(Continued)

*Primary Examiner* — Linglan Edwards
(74) *Attorney, Agent, or Firm* — Cantor Colburn LLP

(57) ABSTRACT

A virtual computer service includes receiving, at a network server computer over a network, an encrypted image and user credentials for a user of a computer, and storing the encrypted image and the user credentials in an image repository that is communicatively coupled to the network server computer. The virtual computer service also includes receiving a request to initiate a session, the request including the user credentials. Upon successful validation of the user credentials, the virtual computer service includes selecting the encrypted image from the image repository, decrypting the encrypted image, activating a session for a virtual computer associated with the computer, and synchronizing session details of the session, once completed, with the image and storing a synchronized image in the image repository.

16 Claims, 6 Drawing Sheets

(56) References Cited

U.S. PATENT DOCUMENTS

| | | | |
|---|---|---|---|
| 7,917,841 B2* | 3/2011 | Chopin et al. | 715/212 |
| 8,250,638 B2* | 8/2012 | Singh et al. | 726/6 |
| 8,301,686 B1* | 10/2012 | Appajodu et al. | 709/201 |
| 2002/0059268 A1* | 5/2002 | Babaian et al. | 707/100 |
| 2003/0105810 A1 | 6/2003 | McCrory et al. | |
| 2008/0271122 A1* | 10/2008 | Nolan et al. | 726/4 |
| 2009/0019075 A1* | 1/2009 | Hutchinson et al. | 707/102 |
| 2009/0172781 A1* | 7/2009 | Masuoka et al. | 726/3 |
| 2009/0240953 A1 | 9/2009 | Paul | |
| 2010/0042672 A1* | 2/2010 | Lo et al. | 709/203 |
| 2010/0107163 A1* | 4/2010 | Lee | 718/1 |
| 2011/0004878 A1 | 1/2011 | Divoux | |
| 2011/0271279 A1* | 11/2011 | Pate | 718/1 |
| 2011/0296201 A1* | 12/2011 | Monclus et al. | 713/190 |
| 2011/0302400 A1* | 12/2011 | Maino et al. | 713/2 |
| 2012/0151482 A1* | 6/2012 | Lee et al. | 718/1 |

OTHER PUBLICATIONS

Interntional Search Report—Written Opinion; International Application No. PCT/US2012/046370; International Filing Date: Jul. 12, 2012; Date of Mailing: Sep. 24, 2012; pp. 1-5.

International Search Report and Written Opinion for PCT Application No. PCT/US2012/046370, dated Sep. 24, 2012, pp. 1-17.

Moreno-Vozmediano et al., "Elastic Management of Cluster-Based Services in the Cloud", ACM Digital Library, pp. 1-6 (2009).

Mell, et al. "The NIST Definition of Cloud Computing (Draft): Recommendations of the National Institute of Standards and Technology", National Institute of Standards and Technology, U.S. Department of Commerce, pp. 1-7 (2011).

Kroeker, "The Evolution of Virtualization, ACM Digital Library", vol. 52, No. 3, pp. 18-20 (2009).

* cited by examiner

VIRTUAL COMPUTER AND SERVICE

CROSS-REFERENCE TO RELATED APPLICATION

This application is a continuation of U.S. patent application Ser. No. 13/187,815, filed Jul. 21, 2011, the disclosure of which is incorporated by reference herein in its entirety.

BACKGROUND

The present invention relates to cloud computing, and more specifically, to a virtual computer and virtual computing service.

Virtual or network computers (also known as network desktops or cloud desktops) refer to computing devices that are stored and/or running on another networked computer or in a computing cloud. The economies of scale and the single image management of virtual personal computers (VPCs) are compelling reasons for large businesses to run virtual computing.

Three models for cloud computing include private, public, and hybrid. In a private cloud, information technology (IT) functionality is implemented over a private network (e.g., a local area network, or virtual private network) as a service behind a business' firewall. In a public cloud, this functionality is provided as a service over a public network, such as the Internet. In a hybrid cloud, this functionality is configured for implementation over a combination of public and private networks based upon various factors, such as security needs, business policies, and the nature of the infrastructure used by the business or enterprise.

SUMMARY

According to one embodiment of the present invention, a method for implementing a virtual computer service includes receiving, at a network server computer over a network, an encrypted image and user credentials for a user of a computer, and storing the encrypted image and the user credentials in an image repository that is communicatively coupled to the network server computer. The method also includes receiving a request to initiate a session, the request including the user credentials. Upon successful validation of the user credentials, the method includes selecting the encrypted image from the image repository, decrypting the encrypted image, activating a session for a virtual computer associated with the computer, and synchronizing session details of the session, once completed, with the image and storing a synchronized image in the image repository.

According to further embodiment of the present invention, a computer program product for implementing a virtual computer service is provided. The computer program product including a storage medium encoded with computer-readable program code, which when executed by a network server computer, cause the network server computer to implement a method. The method includes receiving, at the network server computer over a network, an encrypted image and user credentials for a user of a computer, and storing the encrypted image and the user credentials in an image repository that is communicatively coupled to the network server computer. The method also includes receiving a request to initiate a session, the request including the user credentials. Upon successful validation of the user credentials, the method includes selecting the encrypted image from the image repository, decrypting the encrypted image, activating a session for a virtual computer associated with the computer, and synchronizing session details of the session, once completed, with the image and storing a synchronized image in the image repository.

According to yet a further embodiment of the invention, a method for implementing a virtual computer services is provided. The method includes receiving user credentials at a computer, creating an image from data stored in a storage device that is local to the computer, encrypting the image using the user credentials, compressing the encrypted image, uploading the encrypted image and the user credentials to a network server system, and initiating a session over a network via a virtual computer associated with the computer upon computer boot up and authentication of the user credentials, the session accessing and decrypting the encrypted image.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
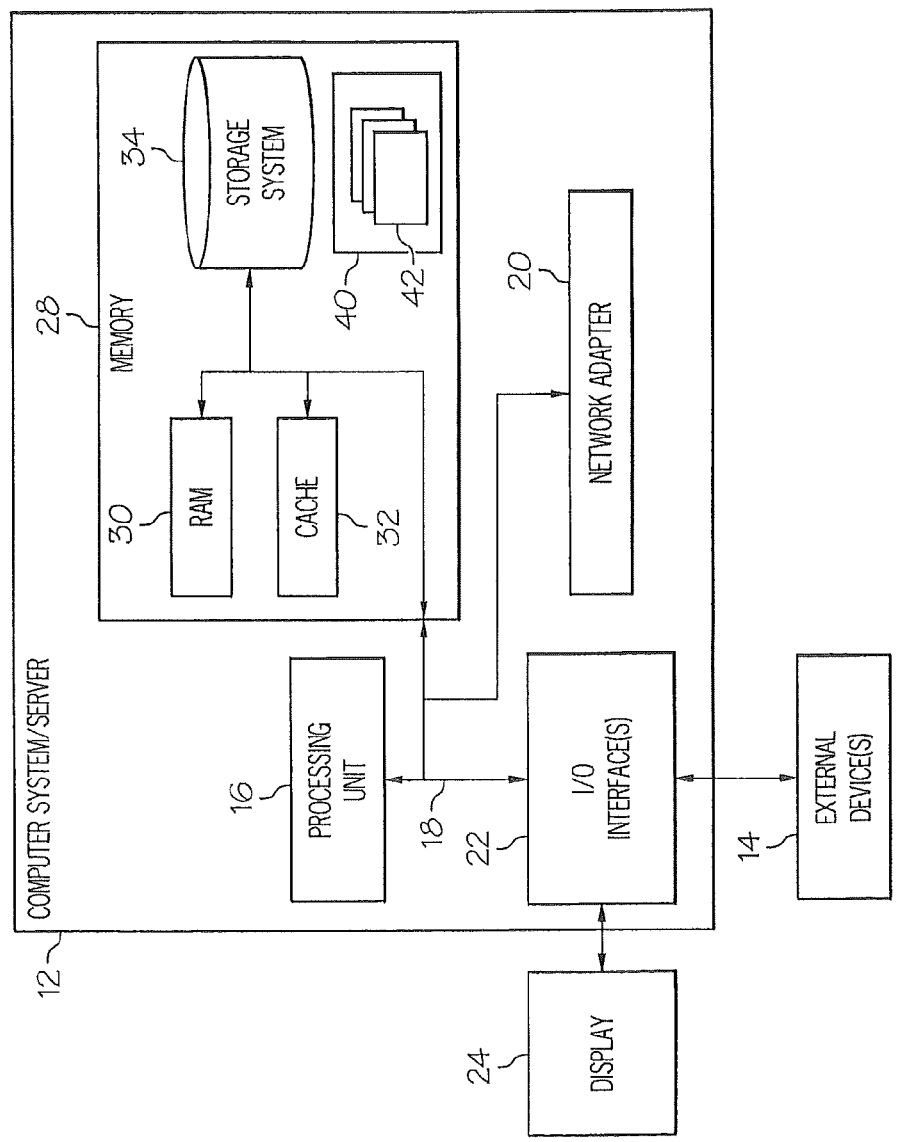
FIG. 1 depicts a cloud computing node according to an embodiment of the present invention.

Exemplary embodiments provide a self-service, cloud-enabled application that enables users to operate on a singular or aggregate basis in which an existing computer (e.g., a personal computer (PC), MacIntosh™, or smart phone) is migrated to a virtualized version that is hosted in a computing and storage cloud. The virtual computing services support a number of "run modes" in which one can dynamically change the way a virtual computer is experienced. These run modes assist in facilitating disaster recovery options and addressing system or network performance concerns. By creating and adding a unique cloud based service that is web accessible, the issues of complexity and control are addressed by building a user experience that allows the end user or client to engage in this computing paradigm without the overhead and support of a large information technology (IT) staff, or obtaining expertise in the design and setup of network computing infrastructures. Since the entire service can be easily interacted with via the World Wide Web, the virtual computing services provide the ability for anyone running a computer device to transform the computer into a virtual computer that is hosted in the cloud. Some advantages of running in the cloud from a virtual computer device include hardware freedom, disaster recovery assistance, centralized operating system (OS) management, and cost savings.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
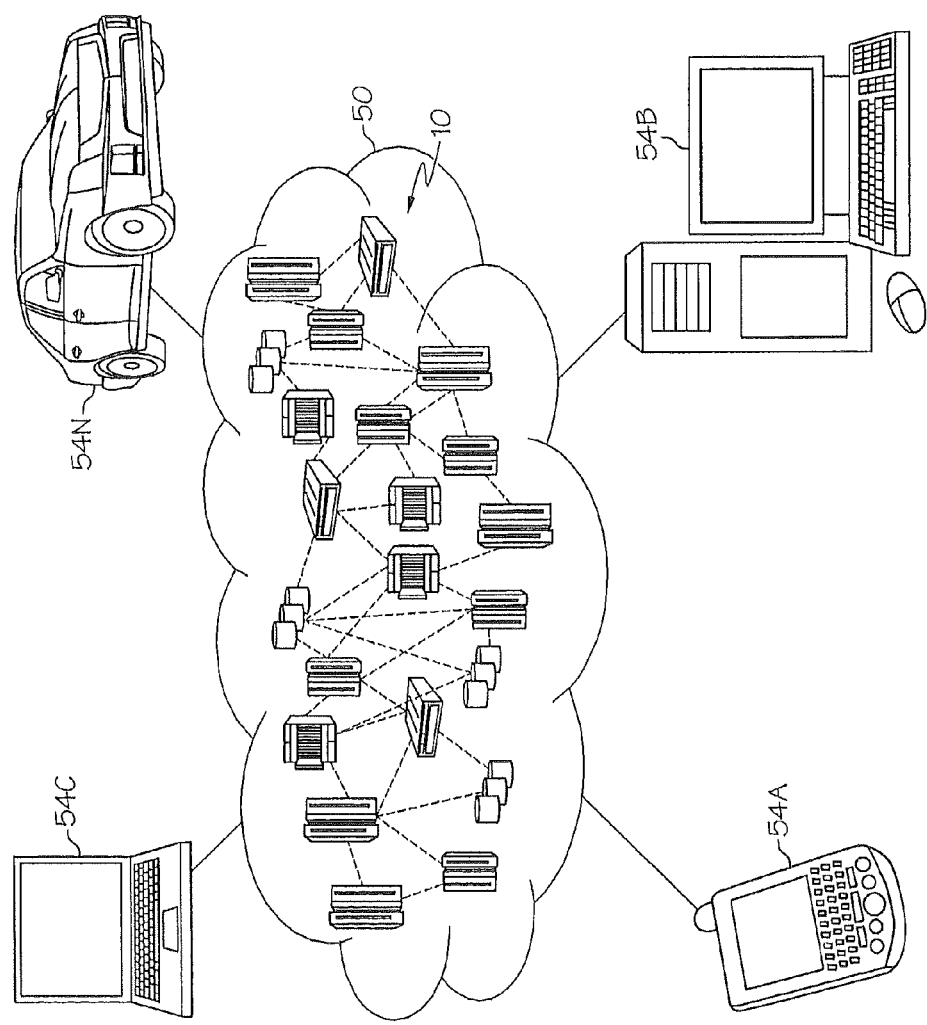
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
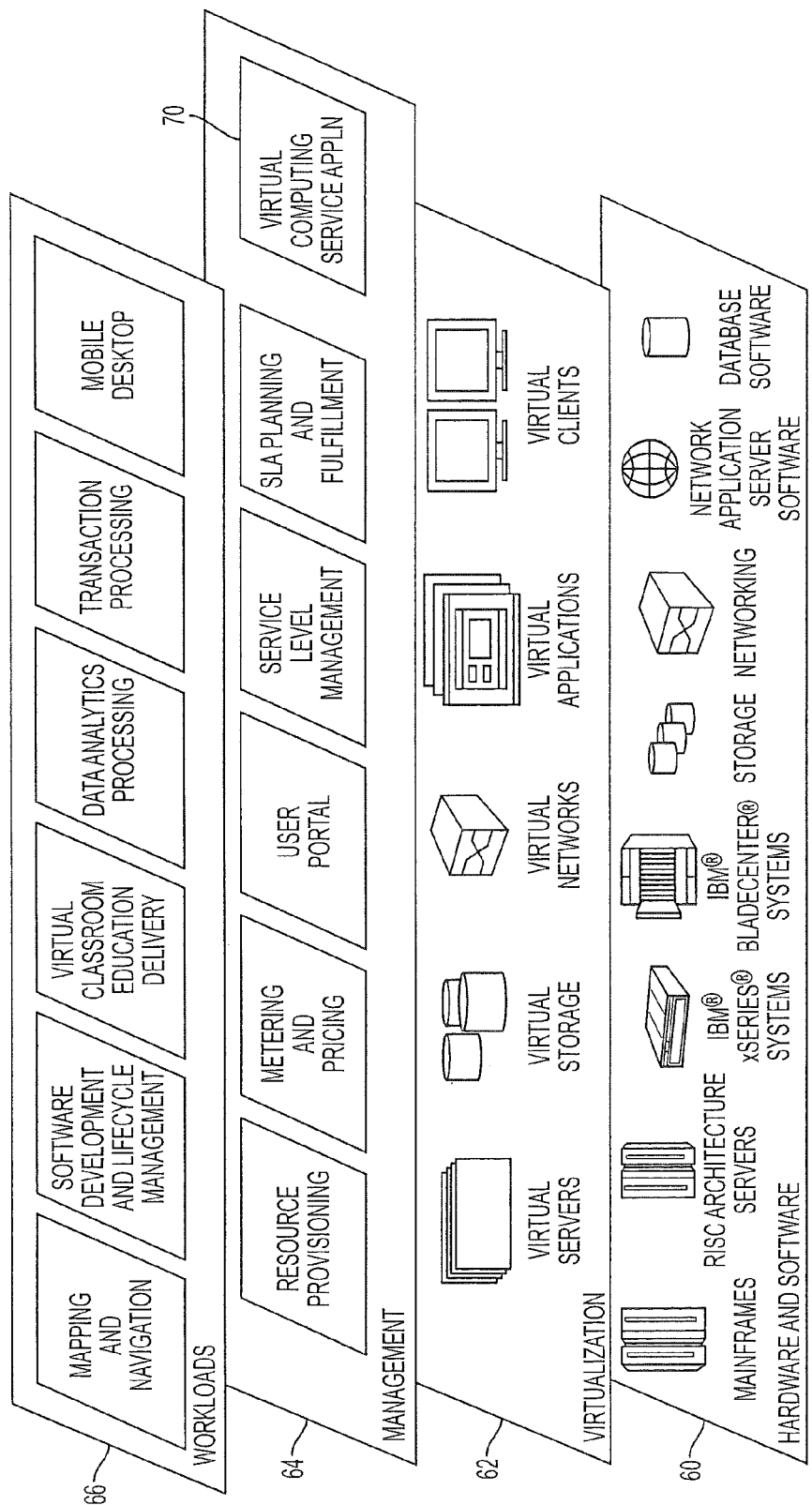
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In an exemplary embodiment, a virtual computing service application 70 in the management layer 64 implements the virtual computing services described herein.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The virtual computing services application 70 includes one or more algorithms to implement embodiments described herein to provide virtual computing services. In an embodiment, the virtual computing services application 70 is coupled to and/or resides in the memory 28 shown in FIG. 1. In addition, embodiments of the virtual computing services application 70 include one or more program modules 42 of the program/utility 40 shown in FIG. 1. In a further embodiment, the virtual computing services application 70 is part of the management layer 64 and is executed on hardware located in the hardware and software layer 60. However, virtualized instances running on the system may be implemented in the virtualization layer 62.

The exemplary virtual computing services may be implemented by a client system (e.g., computer system 12) and a network service system cooperatively configured to provide the ability for any computer device to be imaged, placed under the control or management of a hypervisor (if elected), and run either locally at the computer device, remotely by the network service system, or in a hybrid approach. An image, as described herein, refers to a combination of operating system, appropriate device driver code, and application software as loaded and residing on a physical device such as an internal local hard disk, or static memory device. The image is used by the execution appliance (e.g., laptop or desktop personal computer) to boot and run a computing environment.

In one embodiment, the virtual computing services may be implemented in part by program instructions that are downloaded by a client system (e.g., computer system 12), which program instructions are executed at the computer system 12 to create a bootable image that is then uploaded to the virtual computing services. The program instructions may be initially provided to the computer system 12 as a CD-ROM with hypervisor and imaging tools that are used to create the bootable image or may be downloaded by the computer system 12 on request/registration of the virtual computing services. The program instructions are configured to capture the characteristics of the computer device (e.g., hardware/software types, versions, and requirements) during the imaging process and return this information to a virtual server (e.g., one of the nodes 10 in the cloud environment 50 that provides the virtual computing services). The computer system's 12 hard drive (e.g., memory 28) is imaged, encrypted, compressed, and uploaded to the virtual server. In one embodiment, in order to access the data imaged and stored in the cloud environment 50, the user of the computer system 12 is required to have physical possession of the bootable CD-ROM and unique credentials (e.g., unique identifier/password combination).

If the user loses the original computer system 12 or the bootable CD-ROM, if applicable, the image may be recovered and run by an authentication process provided by the virtual computing services, downloading a new image and booting up on a different computer device. The user now has the choice to access the virtual computing services from the other device.

As indicated above, the virtual computing services may be implemented in a number of run modes, which will now be described in an exemplary embodiment. Once registered and configured to receive the virtual computing services, the computer system 12 is referred to herein as a virtual computing device, or virtual computer.

In a first run mode, the virtual computer (e.g., computer system 12) and hypervisor are run locally on the hardware supplied by the virtual computer. In this mode, the hypervisor is only ensuring there is synchronization between the virtual computer image and the local image when the network connectivity is available. The local image is the image as described above that resides and runs locally on the computing device. The "remote" image is an equivalent image produced using the tooling that is uploaded to a cloud storage device. These two images must be synchronized when running locally to ensure that the local and remote image maintain the same state, e.g., data and settings and files, so that it can serve as a virtual instance of the local copy. This is a high performance run mode as well as a disconnected run mode that may be used in situations where there is no high bandwidth connectivity to the cloud service. The hypervisor may be implemented for enabling system mobility across hardware types. It will be understood that if no system mobility is desired, the hypervisor may be eliminated.

In a second run mode, the virtual computing services run applications and communicate via a standard secure protocol to the virtual computer in a hybrid run approach to provide local rendering of graphics, and memory caching of files.

In a third run mode, the virtual computing services provide all application running and rendering. This mode provides emergency access to the virtual computer by allowing a web browser to directly interact with the virtual computing services and render the desktop. All processing, file storage, etc., is performed by the virtual computing services.

In an embodiment, the run mode is selectable and under the control of the "owner of the image" (e.g., the user of the computing device). There are a number of ways in which switching run modes might be supported. For example, a menu can be presented at the time of boot-up, prompting the user to select the run mode. In a more sophisticated approach, a small application can be added that allows switching run modes in real time while the system is booted. Alternatively, a programmatically selectable approach may be used to enable the computing device to intelligently and automatically select a run mode based on connectivity, performance, and software availability to name only a few possible criteria.

Figure 4:
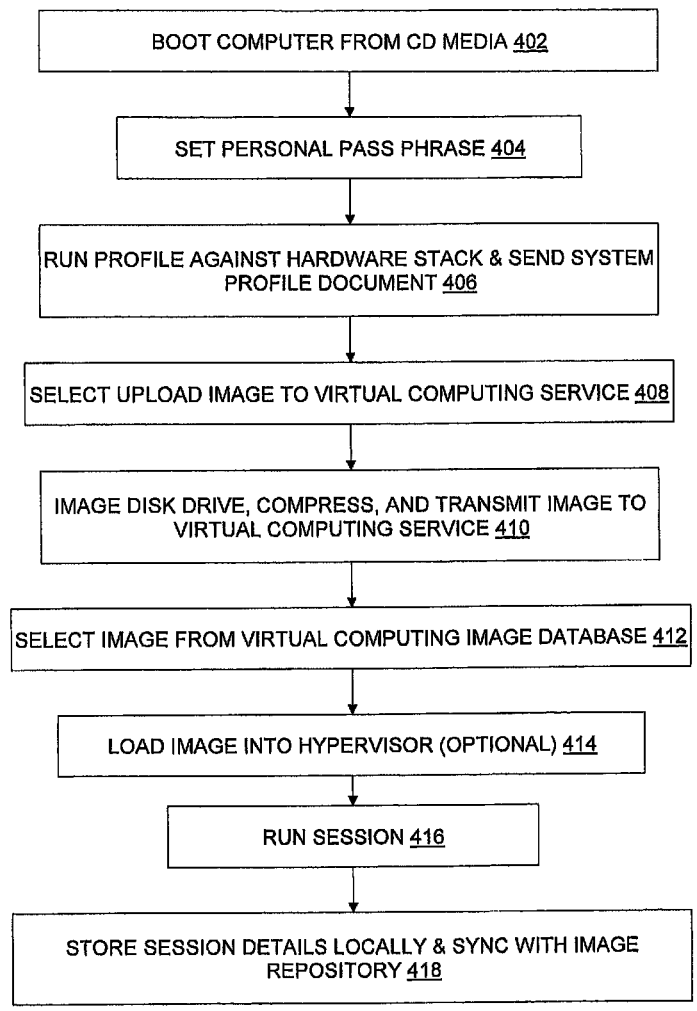
FIG. 4 depicts a flow diagram of a process for creating and implementing a virtual computer according to an embodiment of the present invention.

Turning now to FIG. 4, an exemplary process for creating and implementing a virtual computer will now be described. The processes described in FIG. 4 assume that a user of the computer device 12 has initiated a registration process with the virtual computing services for receiving cloud computing services and has downloaded virtual computing service instructions (e.g., through a CD-ROM). These instructions are also referred to as the virtual computing services application 70.

Creating and implementing a virtual computer supports a live migration process. A live migration process is performed when a virtual machine (e.g., part of a service landscape, such as a web application server that is moved but still connected to the same database server) is moved from within a secured domain over an unsecured domain. For instance, the server is being moved from one data center to another across a wide area or metropolitan area network. The live migration process uses security policies, such as IPSec and filtering mechanisms to protect the data for this cross domain/data center move. This protection includes allowing no leakage of unprotected data over the unsecure network that is in transit. With this protection mechanism, live migration processes may be exploited for moving servers or virtual machines over unsecured networks. Some of the use cases that this would allow include data center consolidation, disaster recovery, and capacity planning, to name a few.

At step 402, the user boots up the computer device 12 from the CD-ROM or media and establishes a unique personal pass phrase (credentials) at step 404. The personal phrase distinguishes the user/device from others in the cloud computing environment 50 and serves to seed the encryption algorithm for encrypting the image data from the computer device 12. The instructions cause data transmission to and from the computer system being migrated to stop in order to protect data from being exposed in the clear. This may include turning off interface(s) that are used for non-system management data in order to prevent receipt of inbound traffic and to discard outbound traffic, or by temporarily putting in denial filters to drop all traffic except system management data. This is also to ensure that inbound/outbound traffic is not permitted after the virtual computer is moved, and before IPSec policies can be installed to protect the traffic. A binary disk drive image is read from the local hard drive of the computer system 12 via the instructions, and the data is encrypted using the encryption key.

At step 406, the instructions run a profile against the hardware stack and send a system profile document to the remote server. Running a profile includes selecting a diagnostic tool provided on the conversion software pack, that can run in the background and monitor all processes, memory consumption, CPU utilization, and I/O activity that is generated under normal usage. This runs for a statistically valid period of time, in some cases over several days, and allows the software to create a system "profile." In most cases, a reasonably accurate profile can be obtained in minutes. The profile may be an averaged and weighted collection of statistical values that represent the usage patterns of the device under normal load, the sizes of files, and types of devices in use in a particular situation. The profile is bundled with the image and maintained and updated. It is built and maintained on the local system, and is transferred to the remote system (e.g., cloud virtual system).

At step 408, the instructions prompt the user to select an "upload image" option. Once selected, the instructions image the computer device's 12 disk drive, compress the image, and upload the compressed image to the virtual service system at step 410. Once uploaded, the user is registered and the computer system 12 is configured to run in the cloud computing environment 50. At this time, however, all traffic to and from the virtual computer (except system management data) are dropped or denied.

At step 412, the user of the computer device 12 (now virtual computer) boots up the computer from the local CD-ROM or media, which connects the virtual computer to the cloud computing environment 50 and the virtual server system. The user enters the credentials, the temporary denial policies are removed to allow communications, the virtual computer selects the appropriate image from the virtual computing services' image repository at step 414, and the image is decrypted. The user initiates a session on the virtual computer in the cloud computing environment 50 at step 416. The hypervisor may allocate all of the memory available (e.g., the memory allocated to a virtual machine in the cloud storage) to run and cache the system. Once the session is completed, the session details are stored locally on the virtual computer and are synchronized with the image in the image repository at step 418.

The exemplary virtual computing services also provide recovery and full-image back up services for virtual computing devices. The recovery and back up services may be implemented by instructions configured via the virtual computing services application 70 or may be provided on a separate CD-ROM. The instructions provide a menu of options from which to select by the user of the virtual computer. In a back up operation, the menu instructs the user to select a back up option for data to be backed up. Once selected, the instructions perform a binary dump and compression on the data, and upload the compressed data to the image repository in the cloud computing environment 50. In a recovery operation, the instructions prompt the user to select a source option on the menu. Once selected, the instructions perform a binary tile transfer, expand operation, followed by writing the recovered data to the local hard drive of the virtual computer.

Figure 5:
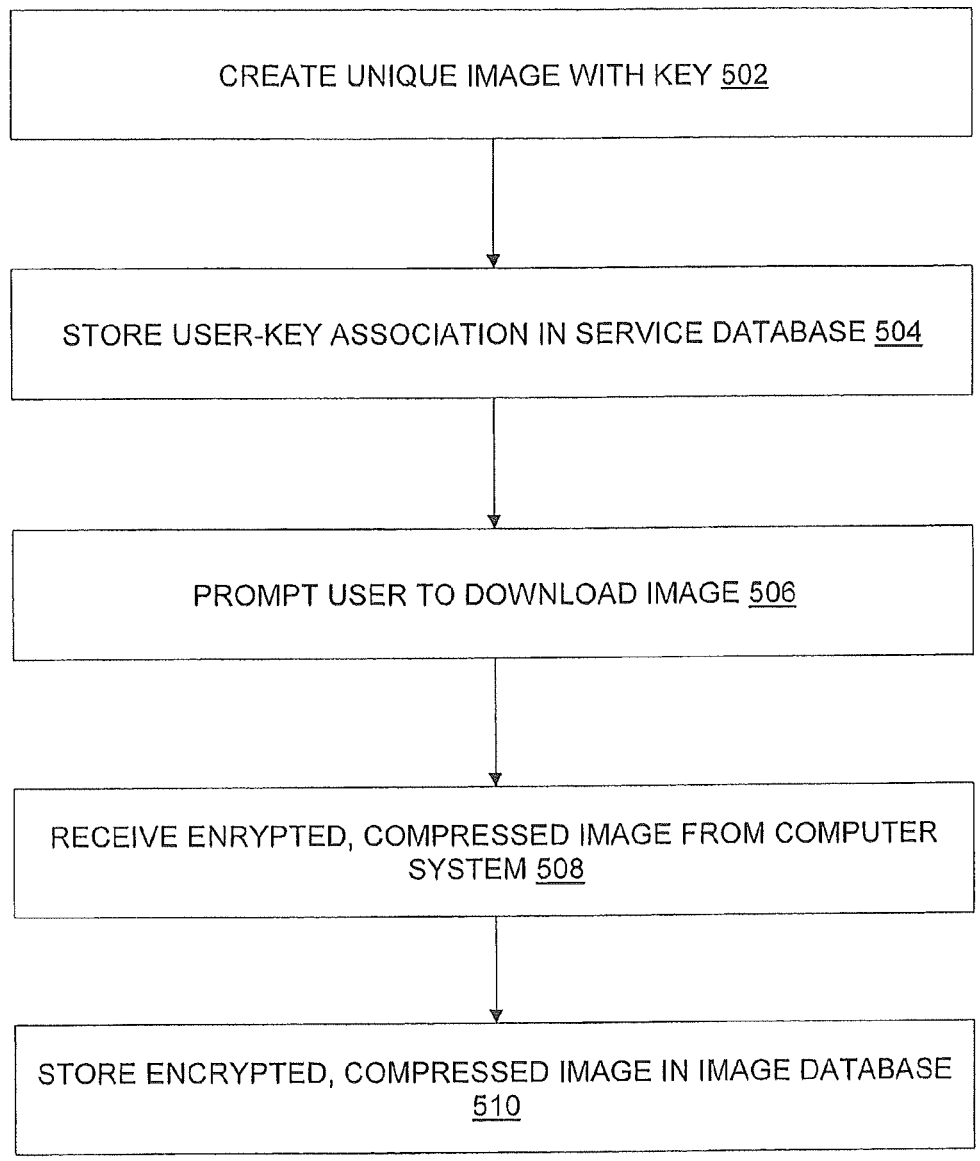
FIG. 5 depicts a flow diagram of a process for providing a virtual computing service according to an embodiment of the present invention.

As indicated above, the virtual computing services provide virtual computer image encryption services. Turning now to FIG. 5, a process for implementing this service will now be described in an embodiment. At step 502, a unique image with a key is created when the user of computer system 12 registers to the use the virtual computing services (e.g., the user enters into an agreement regarding the terms and fees associated with the service). The association between the unique image and key is stored in a service database of the virtual server system at step 504 (e.g., in virtual storage systems of virtualization layer 62 and hardware elements shown in hardware and software layer 60 of FIG. 3).

At step 506, the user is prompted to download the unique image on the computer system 12. Upon download, a bootable CD is created with the appropriate hypervisor (if needed), the unique key and tools/applications for the specific type of computer registered for the services. The bootable CD includes the unique image, which is encrypted and compressed. The virtual server system includes instructions (e.g., via the virtual computing services application 70) to request and receive the unique image, and at step 508, the unique image is uploaded and received at the virtual server system, which then stores the unique image in the image database in the computing cloud environment 50 at step 510.

The connectivity processes for a virtual computer under migration may be adjusted according to the system environment. For example, if a layer 2 VLAN is implemented across a data center over a wide area network (WAN) or a metropolitan area network (MAN) (e.g., layer 2 VLAN over MPLS), then there is likely a requirement to make sure the switches would forward to the virtual computer's MAC address once it is moved over to a remote data center. Switches forward frames based on destination MAC within a VLAN (e.g., transparent bridging protocol), so they need to be reconfigured once the virtual computer's MAC is moved remotely. With layer 3 connectivity (i.e., the virtual computer's IP addresses will be moved across layer 3 routing domain from data center to another), if it is assumed the entire subnets are moved, then the reachability to this subnet will need to be updated by the routing core. This may take some time, during which packets may still be forwarded to the original router to which the virtual computer was connected before the move. This may be solved by creating a tunnel from the original router to the new router for the affected moved IP addresses.

Once the router reachability is updated, the tunnel is no longer needed and is removed. For connections that are not managed by live migration (LM), e.g., remote connections to virtual computers being moved, and which are not secured, and if once the virtual computer is moved these connections need to be secured (e.g., via IPSec), they need to be reset before the migration happens. Policies in the virtual computer after migration may not allow new connection establishment without the policy-defined security protocol.

In order to reduce the number of non-managed connections that must be reset, the following actions may be taken: 1) the policy on the virtual computer to be migrated may be examined to determine the connections that are using IPSec—those connections may be left running; 2) policy on the virtual computer to be migrated may be examined to determine the connections that are using application transparent-transport layer security (AT-TLS)—these connections may be left running; and 3) connections bound to ports known to be unconditional TLS ports may be left running.

To perform these steps, the live migration may request of list of connections from the virtual machine (e.g., via a Netstat command). For policy checks, the live migration may build a condition simulator and then processed by a policy look up routine. The results of each connection lookup in the policy may yield a result, which describes whether that connection is protected by IPSec or AT-TLS. Also the live migration may be configured with a list of ports that are known to be unconditional TLS ports (e.g., in cases where the application is enabled to unconditionally use TLS) to determine whether the connection is using TLS.

Technical effects include a method of securing data transmission of a virtual machine within a service landscape (e.g., software-as-a-service, or SaaS) that is live-migrated from a secured environment to another environment over a less-secured media (e.g., Internet, wide- or metropolitan-area network). The virtual machine, through coordination with the hosting platform management hypervisor, is frozen in time (i.e., all software states are captured) and is moved to a new hosting platform and re-activated without affecting software and network connections (e.g., connections to databases appear in tact, just temporary paused), memory states, and other resources. The live migration includes stops data transmission to and from the virtual machine being migrated, the virtual machine is moved to the new hosting platform and restarted on the new hosting platform while all traffic in and out to it are dropped or denied until appropriate IPSec policies to both the virtual machine that was moved and the server in communication with it is installed. The temporary denial policies are then removed.

Figure 6:
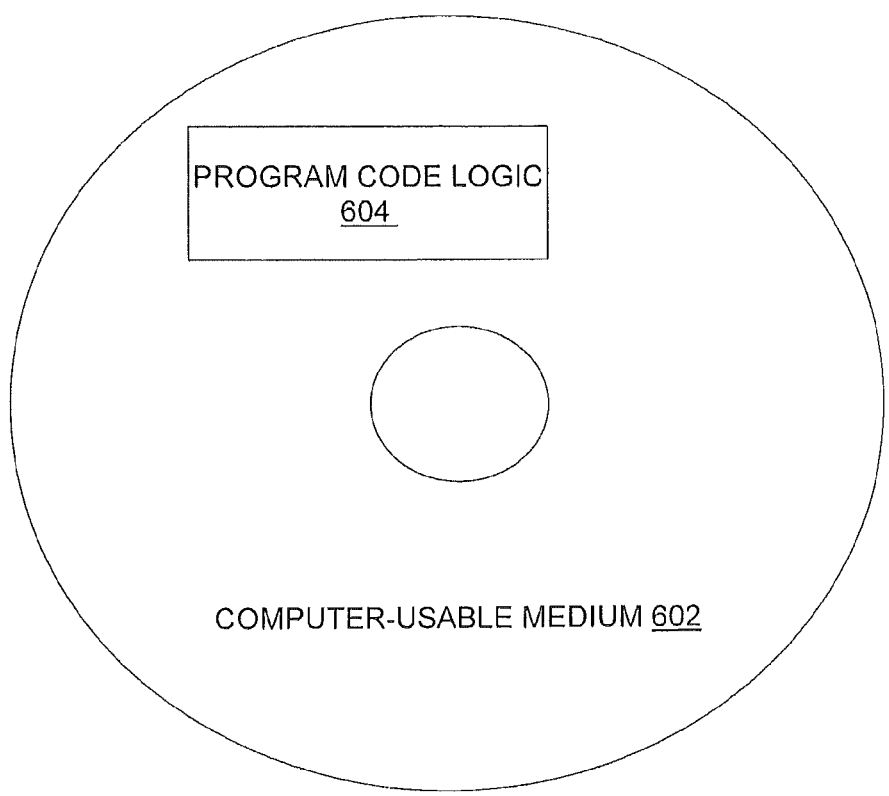
FIG. 6 depicts a computer program product.

As will be appreciated by one skilled in the art, aspects of the present invention may be embodied as a system, method or computer program product 600, as shown in FIG. 6. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) 602 having computer readable program code 604 embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method, comprising:
receiving, at a network server computer over a network, an encrypted image and user credentials for a user of a computer, the encrypted image including graphics data and application data, and storing the encrypted image and the user credentials in an image repository that is communicatively coupled to the network server computer;
receiving a request to initiate a session, the request including the user credentials;
upon successful validation of the user credentials, selecting the encrypted image from the image repository;
decrypting the encrypted image;
activating a session for a virtual computer associated with the computer;
synchronizing session details of the session, based on a run mode selected among plurality of different run modes controlled by the network server computer once completed, with the image and storing a synchronized image in the image repository; and
dynamically selecting the run modes to control a location among the computer and the virtual computer where the graphics data and the application data are executed, the run modes comprising:
a first run mode that runs the virtual computer and a hypervisor on a local image of the system such that graphic rendering, memory caching of files, and application data execution is performed on the local image;
a second run mode that performs graphic rendering, memory caching of files and application data execution at the network server remotely located from the local image; and
a third run mode that performs graphic rendering and memory caching of files on the local image while the network server executes the application data.

2. The method of claim 1, further comprising providing instructions to the computer, the instructions configured to create an image from a storage device local to the computer, receive the user credentials, encrypt the image using the user credentials, and compress the encrypted image.

3. The method of claim 2, wherein the instructions are further configured to perform a back up operation on the computer by performing a binary dump and compression on computer data stored on the computer, the method further comprising receiving the computer data resulting from the binary dump and compression over the network, and storing the computer data as a new image in the image repository.

4. The method of claim 2, wherein the instructions are further configured to perform a recovery operation on the computer by selecting a source option via a menu of options and performing a binary file transfer and expand operation, and writing recovered data to the storage device of the virtual computer.

5. The method of claim 2, wherein the instructions are further configured to create a bootable disk that includes a unique key associated with the image, the unique key operable for encrypting the image.

6. The method of claim 5, wherein the bootable disk includes a hypervisor.

7. The method of claim 1, wherein the network is a cloud computing network.

8. A computer program product comprising a non-transitory storage medium encoded with computer-readable program code, which when executed by a network server computer, cause the network server computer to implement a method, the method comprising:
receiving, at the network server computer over a network, an encrypted image and user credentials for a user of a computer, the encrypted image including graphics data and application data, and storing the encrypted image and the user credentials in an image repository that is communicatively coupled to the network server computer;
receiving a request to initiate a session, the request including the user credentials;
upon successful validation of the user credentials, selecting the encrypted image from the image repository;
decrypting the encrypted image;
activating a session for a virtual computer associated with the computer; and
synchronizing session details of the session, once completed based on a run mode selected among a plurality of different run modes controlled by the network server computer, with the image and storing a synchronized image in the image repository; and
dynamically selecting the run mode to control a location among the computer and the virtual computer where the graphics data and the application data are executed, the run modes comprising:
a first run mode that runs the virtual computer and a hypervisor on a local image of the system such that graphic rendering, memory caching of files, and application data execution is performed on the local image;
a second run mode that performs graphic rendering, memory caching of files and application data execution at the network server remotely located from the local image; and
a third run mode that performs graphic rendering and memory caching of files on the local image while the network server executes the application data.

9. The computer program product of claim 8, wherein the method further includes providing instructions to the computer, the instructions configured to create an image from a storage device local to the computer, receive the user credentials, encrypt the image using the user credentials, and compress the encrypted image.

10. The computer program product of claim 9, wherein the instructions are further configured to perform a back up operation on the computer by performing a binary dump and compression on computer data stored on the computer, the method further comprising receiving the computer data resulting from the binary dump and compression over the network, and storing the computer data as a new image in the image repository.

11. The computer program product of claim 9, wherein the instructions are further configured to perform a recovery operation on the computer by selecting a source option via a menu of options and performing a binary file transfer and expand operation, and writing recovered data to the storage device of the virtual computer.

12. The computer program product of claim 9, wherein the instructions are further configured to create a bootable disk that includes a unique key associated with the image, the unique key operable for encrypting the image.

13. The computer program product of claim 12, wherein the bootable disk includes a hypervisor.

14. The computer program product of claim 8, wherein the network is a cloud computing network.

15. A method, comprising:
receiving user credentials at a computer;
creating an image from data stored in a storage device that is local to the computer;
encrypting the image using the user credentials, the encrypted image including graphics data and application data;
compressing the encrypted image;
uploading the encrypted image and the user credentials to a network server system; and
initiating a session over a network via a virtual computer associated with the computer upon computer boot up and authentication of the user credentials, the session accessing and decrypting the encrypted image, wherein initiation the session further comprises:
synchronizing session details of the session based on a run mode selected among a plurality of different run modes controlled by the network server computer, once completed, with the image and storing a synchronized image in the image repository; and
dynamically selecting the run mode to control a location among the computer and the virtual computer where the graphics data and the application data are executed, the run modes comprising:
a first run mode that runs the virtual computer and a hypervisor on a local image of the system such that graphic rendering, memory caching of files, and application data execution is performed on the local image;
a second run mode that performs graphic rendering, memory caching of files and application data execution at the network server remotely located from the local image; and
a third run mode that performs graphic rendering and memory caching of files on the local image while the network server executes the application data.

16. The method of claim 15, further comprising:
storing session details of the session on the computer.

* * * * *